3,202,525
ADDITION OF SEA WATER DURING PRECIPITATION OF SILICA PIGMENT
Oliver W. Burke, Jr., 506 Intracoastal Drive, Fort Lauderdale, and Carey B. Jackson, Pompano Beach, Fla.; said Jackson assignor to said Burke
No Drawing. Filed Oct. 3, 1961, Ser. No. 142,494
14 Claims. (Cl. 106—306)

The present invention relates to siliceous filler material and to processes for producing same, and to natural, or synthetic rubber or other elastomers, such as silicone rubbers, or plastomers containing and reinforced by such siliceous filler material.

OBJECTS

Particular objects of the present invention, severally and interpendently, are to provide improved processes for the production of siliceous pigment precipitated from an alkaline medium, to provide improved siliceous filler material at economic cost, and to provide natural and synthetic rubber including silicone rubber and plastomers reinforced with such improved siliceous material.

Other objects and advantages of the invention will be apparent from a consideration of the herein set forth general and specific description of illustrative embodiments thereof.

STATE OF THE ART

In British Patent No. 299,483 (Peter Spence & Sons Ltd.), acceptance October 29, 1928, such a silica pigment is produced in a substantially pure, extremely light form by neutralizing the alkali of a sodium silicate solution in the presence of a suitably regulated amount of sodium carbonate, by the gradual addition of sodium bicarbonate or carbon dioxide, the sodium carbonate being present initially, or being added as required, or being formed by the gradual addition of a solution of sodium bicarbonate or carbon dioxide. In British Patent No. 561,750 (E. K. Cole, Ltd.), accepted June 2, 1944, a similar process is disclosed, acidulating sodium silicate by the gradual addition of a mineral acid in the presence of electrolytes including sodium chloride and salts of weak acids or weak bases or both. By these processes it is known to obtain a gradual separation of the silica in a non-gelatinous, somewhat flocculent, easily filterable white and opaque condition in combination or association with a portion of the alkali and in a physical condition such that after removal of the mother liquor washing with water, after-treating with dilute acid and again washing and drying, the silica pigment shrinks but little compared with silica gel and is in an extremely light, white, soft and bulky form.

PRESENT INVENTION IN GENERAL

The present invention has disclosed that an improved siliceous filler material capable of reinforcing elastomers and plastomers may be prepared by a process in which an aqueous solution of sodium silicate is acidulated at controlled rates with acidulating agent, which process is particularly characterized in that there is added to the aqueous solution, in which the pigment is being formed, sea water in the proportion of from about one-half liter to fifteen liters of sea water per mole of alkalinity calculated as $Na_2O$ of the sodium silicate. The present invention has further disclosed that when the sea water is so used in the proportion of from about one-half to three liters of sea water per mole of alkalinity, then the precipitated pigment requires to be after-treated to impart good rubber reinforcing characteristics thereto, but that when the sea water is so used in proportions of greater than three liters of sea water per mole of said alkalinity, then the siliceous pigment produced has the characteristics of a reinforcing filler without such after-treatment. The invention has also shown that the sea water may be added gradually before and/or during the acidulation, preferably being gradually added during the precipitation but prior to the completion of the precipitation of the silica content of the sodium silicate solution, or alternatively being so added prior to the commencement of such precipitation. The invention has also shown that the process may be carried out under temperature conditions ranging from room temperature to elevated temperature, i.e. from 20° to 150° C., the materials being under sufficient pressure to maintain the desired temperature in the upper part of this range; and that at atmospheric pressure temperatures of from 50° to 95° C. may be employed to accelerate the process.

The improved siliceous filler material produced by the present process is characterized by greater yield per pound of sodium silicate employed than that of other processes; by greater ability to reinforce elastic and/or plastic materials, and in presently preferred embodiments by being readily filterable, readily dryable, and readily dispersible in elastomers and plastomers either as dry product or as wet cake or aqueous suspension; by the fact that its dried filter cake may be very easily reduced to a powder by simple rubbing without need for grinding; and by other advantages which will hereinafter appear.

The polymer compositions and masterbatches formed by combining the new filler materials of the present invention with elastic and/or plastic high polymers are obtained at less expense and have satisfactory tensile strengths, elongations and tensile products as compared with such materials reinforced by previously known siliceous pigments prepared by the prior art processes of acidulating sodium silicate solutions.

CONDITIONS AND MATERIALS

Sodium silicate may be represented by the formula $Na_2O(SiO_2)_x$, wherein $x$ has a value between 1 and 4, usually between 1.16 and 3.74. For purposes of economy, in commercial sodium silicates the value of $x$ is usually close to the upper end of this range, e.g., 3.22 in the 41° Bé. sodium silicate of commerce.

In practice of the present invention the concentration of sodium silicate $Na_2O(SiO_2)_x$ in the aqueous solution containing the same may vary from about 50 grams per liter to about 200 grams per liter, and the rate of acidulation may be controlled by adding acidulating agent gradually throughout the acidulating process until the acidulation is complete, as practiced by the prior art, or by following such practice only until the approximate point at which the precipitation of silica pigment commences and then augmenting the rate of acidulation to rapidly precipitate the pigment in accordance with the invention of our co-pending application Ser. No. 142,661.

In the practice of the present invention with the sea water in the proportion of from one-half to three liters per mole of $Na_2O$ of such sodium silicate, the precipitated pigment material obtained may be materially improved in its rubber reinforcing ability by after-treatment to reduce residual alkalinity, either with alkalinity reducing agents as used by the prior art, or by after-treatment with sea water in accordance with the invention of our copending application Ser. No. 142,495. However in the practice of the present invention with more than three liters of sea water per mole of such alkalinity, need for such after-treatment to obtain the full advantage of the siliceous pigment material as a reinforcing filler for elastomers and/or plastomers is eliminated.

The acidulating agents which may be used include mineral acids and their anhydrides, e.g. hydrochloric, sulfuric, nitric, and sulfurous acids, sulfur dioxide, and sulfur trioxide; carbon dioxide and its aqueous solution; the acid sodium salts e.g. sodium bicarbonate, sodium bisulfate, and the like; organic acids, e.g. formic acid; and mixture of the foregoing; and combinations of the foregoing.

In the acidulation of the solution the permissible rate of acidulation is dependent in part on the strength and concentration of the acidulating agent. Weakly acidic acidulating agents may be used more concentrated than can stronger ones, e.g., carbon dioxide may be bubbled through the solution full strength or diluted with air or other inert gas; hydrochloric acid may be used in aqueous solution in strengths of from about 12 normal down to about 1.0 normal or less; sulfuric acid may be correspondingly used in concentration of from about 6 normal down to about 0.5 normal or less; sodium bicarbonate may be used in concentrations up to saturated solutions. While in the broader aspects of the invention other acidulating agents may be used acidulation with sodium bicarbonate or carbon dioxide is preferred, the latter being most preferred.

After the silica pigment has been precipitated, it may be recovered from the mother liquor in any suitable way, e.g., by centrifuging, filtering, etc., and the silica pigment material may be removed as wet cake for further use with or without any further after treatment. When after-treatment is employed the silica pigment material may be reduced in alkalinity as by washing or soaking with any one of several alkalinity reducing agents, or with sea water, as set forth in copending application Ser. No. 142,495. Sodium bicarbonate solution, aqueous solution of soluble mineral acid, organic acid or carbon dioxide, may be employed as alkalinity reducing agent.

If desired the wet cake may be employed per se, as for example in master-batching with latices of natural or synthetic elastomers or plastomers or combinations of these, or the water may be removed to form dry silica pigment material.

The process may be conducted in a batchwise or stepwise manner, or continuously, depending on available equipment. Suitable apparatus, for example, is set forth in copending application Ser. No. 142,668.

The novel features of the invention are set forth in the claims appended hereto, but the practice of the invention itself will be more precisely understood by reference to the following specific examples embodying the same, which are to be considered as illustrative and not restrictive of the invention.

Example I

In this example 2000 ml. of 41° Bé. commercial sodium silicate containing 4 moles of $Na_2O(SiO_2)_{3.22}$ was diluted with 4 liters of water and was placed in a closed pressure vessel with paddle agitator running at moderate speed. Then gradually to the vessel while stirring was added 15.5 liters of sea water and 4.8 moles (211.2 g.) of carbon dioxide. In Table I the rates of addition of sea water and carbon dioxide gas are set forth.

TABLE I

| Time, Cumulative (minutes) | Sea Water, Cumulative (liters) | Carbon Dioxide, Cumulative (moles) |
|---|---|---|
| 10 | 1.00 | 0.05 |
| 40 | 3.48 | 0.56 |
| 70 | 4.08 | 0.62 |
| 100 | 4.30 | 0.68 |
| 130 | 4.34 | 0.87 |
| 145 | 4.60 | 0.92 |
| 175 | 8.00 | 0.92 |
| [1] 190 | 8.00 | 0.95 |
| 205 | 8.00 | 0.97 |
| 235 | 9.22 | 1.02 |
| 265 | 10.42 | 1.05 |
| 280 | 15.50 | 1.05 |
| 310 | ---------------- | 1.10 |
| 340 | ---------------- | 1.12 |
| 370 | ---------------- | 1.17 |
| 385 | ---------------- | 1.12 |
| 400 | ---------------- | 1.28 |
| 445 | ---------------- | 1.34 |
| 490 | ---------------- | 1.92 |
| 500 | ---------------- | 2.68 |
| 505 | ---------------- | 2.74 |
| 510 | ---------------- | 3.95 |
| 514 | ---------------- | 4.80 |

[1] Initial precipitation of silica.

The silica precipitate was filtered and washed with water and the filter cake divided into 5 portions.

A first portion of this filter cake was further water washed, filtered, dried in an oven at 105° C., ground, screened through a 150 mesh screen and this product was designated "silica 1–A."

A second portion of said filter cake was further water washed and acidified with 2 N hydrochloric acid until acid to methyl orange then sufficient sodium carbonate was added to make the precipitate just alkaline to methyl orange then the precipitate was filtered, washed and dried in an oven at 105° C., ground and screened through a 150 mesh screen and this product was designated as "silica 1–B."

A third portion of the filter cake was treated in the same manner as "silica 1–B" heretofore, except that said precipitate was slurried in water and boiled for ½ hour and then was made acid to methyl orange and then sufficient sodium carbonate was added to make said precipitate just alkaline to methyl orange. The filtered, washed, dried and ground product was designated as "silica 1–C."

A fourth portion of the filter cake was reacted with 3 liters of sea water for 12 hours and then the siliceous material was filtered, water washed with 2 liters of fresh water, dried at 105° C. and passed through a 150 mesh screen and designated as "silica 1–D."

To a fifth portion of the filter cake was added 3 liters of sea water and the product boiled for 1 hour and then the siliceous material was filtered, water washed with 2 liters of fresh water, dried at 105° C. and passed through a 150 mesh screen and designated as "silica 1–E."

The silica pigment materials designated as silicas 1–A, 1–B, 1–C, 1–D and 1–E were each compounded with a polymer to be reinforced according to the compounding recipe set forth in Table II hereof.

TABLE II

Compound ingredients: Quantities (grams)
- Butadiene-styrene copolymer [1] _____ 100.0
- Silica pigment material _____ 58.5
- Antioxidant, 2,2 - methylene-bis(4-methyl-6-t. butylphenol) [2] _____ 2.0
- Triethanolamine _____ 1.0
- Paracoumarone-indene resin [3] _____ 10.00
- Stearic acid _____ 3.0
- Zinc oxide _____ 5.0
- Di-2-benzothiazyl disulphide [4] _____ 1.25
- N,N-di-O-tolylguanidine [5] _____ 1.75
- Sulfur _____ 3.0

[1] SBR-1500.
[2] Antioxidant 2246, a trademark product of American Cyanamid Co.
[3] Cumar Resin RH, a trademark product of Allied Chemical Corp.
[4] Altax, a trademark product of R. T. Vanderbilt Co., Inc.
[5] DOTG, a trademark product of American Cyanamid Co.

In compounding the stock the selected silica pigment material was milled into the SBR-1500 together with the antioxidant and triethanolamine and the stocks aged overnight, and then milled with the remaining compounding ingredients and cured for 45 minutes at 287° F.

The physical test data for the respective vulcanizates containing the foregoing silica pigments is set forth in Table III hereof.

TABLE III

| Silica tested (in vulcanizate) | Tensile (p.s.i.) | Elongation (percent) | Modulus (300%) | Hardness (Shore A) |
|---|---|---|---|---|
| 1-A | 3,225 | 600 | 885 | 66 |
| 1-B | 2,862 | 625 | 1,040 | 67 |
| 1-C | 3,125 | 625 | 1,040 | 67 |
| 1-D | 3,240 | 750 | 733 | 65 |
| 1-E | 3,000 | 650 | 930 | 65 |

The data of Table III clearly shows that the siliceous material produced by the process hereof is a reinforcing silica and requires no after-treatment to improve the reinforcing properties thereof.

*Example II*

When the procedure of Example I is repeated except that in lieu of the gradually added 15.5 liters of sea water, 22 liters of sea water are added over a similar period of time, the siliceous pigment product is obtained in a somewhat greater yield than in Example I and has comparable reinforcing properties also without after-treatment.

*Example III*

When the procedure of Example I is repeated except that in lieu of the gradually added 15.5 liters of sea water, 12.7 liters of sea water are added over a like period, the product is obtained in slightly smaller yield than in Example I and has comparable reinforcing properties without after-treatment.

*Example IV*

When the procedure of Example I is modified so that in lieu of the gradually added 15.5 liters of sea water, 6.0 liters of sea water are added over a like period and so that following completion of the precipitation and before the precipitate is separated from the mother liquid a further 16.0 liters of sea water are gradually added, the product after soaking overnight being filtered, washed with four liters of fresh water, dried at 105° C. and passed through a 150 mesh screen, a siliceous pigment comparable in reinforcing properties to the product of Example I is also obtained.

*Example V*

When the procedure of Example I is followed except that in lieu of the 15.5 liters of sea water added during the acidulation three liters of sea water are pre-added to the sodium silicate solution gradually over a period of two hours while mildly agitating, the remaining three liters of sea water being added concurrently with the carbon dioxide over a period similar to that employed in Example I, the product, after filtration, being boiled for two hours with ten liters of sea water, then filtered, dried, and screened as in Example I, a pigment of comparable reinforcing properties is likewise obtained.

*Example VI*

When the procedure of Example IV is followed, except that the 6.0 liters of sea water are added to the sodium silicate solution gradually over a period of four hours while mildly agitating prior to the commencement of acidulation, a reinforcing pigment is also obtained.

*Example VII*

When the procedure of Example VI is followed except that 22 liters of sea water are gradually added over a six hour period before the acidulation is commenced, the product obtained also has reinforcing properties.

*Example VIII*

When Example I is repeated, but at a temperature of 80° C., the time of acidulation being reduced to ninety minutes and the time of addition of sea water being correspondingly reduced, the pigment obtained also has reinforcing properties.

In the foregoing examples the rate of acidulation has been increased at approximately the point at which pigment precipitation commences, in accordance with the invention of our copending application Ser. No. 142,661 since that invention has disclosed that such practice is advantageous rather than detrimental as compared to the continued slow acidulation of the prior art. However it will be understood that the present invention may be practiced with such slow acidulation throughout, and is not limited to use with the invention of the copending application.

While there have been described herein what are at present considered preferred embodiments of the invention, it will be obvious to those skilled in the art that minor modifications and changes may be made without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

We claim:

1. In a process for forming siliceous pigment as a precipitate from an aqueous medium containing sodium silicate, the improvement which comprises
    (a) reacting the sodium silicate in the aqueous medium with sea water and acidulating agent to form the pigment,
    (b) the sea water being added to the aqueous medium in the proportion of from about one-half liter to about fifteen liters of sea water per mole of alkalinity, calculated as $Na_2O$, of the sodium silicate, and
    (c) said proportion being added to the aqueous medium prior to the completion of the precipitation of the pigment therefrom.

2. Process according to claim 1, in which the sea water is added in the proportion of from about one to six liters of sea water per mole of said alkalinity.

3. Process according to claim 1, in which the sea water is added in the proportion of from about one to three liters of sea water per mole of said alkalinity.

4. Process according to claim 1, in which the sea water is added in the proportion of between three and six liters of sea water per mole of said alkalinity.

5. Process according to claim 1, in which the acidulating agent is carbon dioxide.

6. Process according to claim 1, in which the sea water is gradually added prior to the addition of the acidulating agent.

7. Process according to claim 1, in which the sea water is gradually added during the addition of the acidulating agent.

8. Process according to claim 1, in which the sea water is gradually added during the addition of the acidulating agent prior to the commencement of precipitation of the silica pigment material.

9. Process according to claim 1, in which the precipitation is carried out under temperature conditions in the range of 20° to 150° C.

10. Process according to claim 1, in which the precipitation is carried out under temperature conditions in the range of 50° to 95° C.

11. Process according to claim 1, in which the process is carried out batchwise.

12. Process according to claim 1, in which the process is carried out continuously.

13. Process according to claim 5, in which the sea water is added in the proportion of from about one to three liters of sea water per mole of said alkalinity.

14. Process according to claim 5, in which the sea water is added in a proportion between three and six liters of sea water per mole of said alkalinity.

References Cited in the file of this patent

UNITED STATES PATENTS

| 2,806,012 | Allen | Sept. 10, 1957 |
| 2,884,402 | Bachmann et al. | Apr. 28, 1959 |

FOREIGN PATENTS

| 299,483 | Great Britain | Oct. 29, 1928 |

OTHER REFERENCES

The Condensed Chemical Dictionary, 6th ed., published by Reinhold Corp., New York, 1961, pages 1009–1010 relied on. (Copy in Group 150.)